US008622606B2

(12) United States Patent  
Miller

(10) Patent No.: US 8,622,606 B2  
(45) Date of Patent: Jan. 7, 2014

(54) MICRO-CHANNELS, MICRO-MIXERS, AND MICRO-REACTORS

(75) Inventor: Richard T. Miller, Corvallis, OR (US)

(73) Assignee: State of Oregon acting by and through the State Board of Higher Education on behalf of Oregon State University, Corvallis, OR (US)

( * ) Notice: Subject to any disclaimer, the term of this patent is extended or adjusted under 35 U.S.C. 154(b) by 1216 days.

(21) Appl. No.: 12/238,404

(22) Filed: Sep. 25, 2008

(65) Prior Publication Data

US 2009/0092526 A1    Apr. 9, 2009

Related U.S. Application Data

(60) Provisional application No. 60/995,329, filed on Sep. 25, 2007.

(51) Int. Cl.
 *B01F 13/00* (2006.01)
(52) U.S. Cl.
 USPC ........................................................ 366/341
(58) Field of Classification Search
 USPC ........................................................ 366/341
 See application file for complete search history.

(56) References Cited

U.S. PATENT DOCUMENTS

| 3,914,348 A | 10/1975 | Kors et al. |
| 7,093,776 B2 | 8/2006 | Schneider |

FOREIGN PATENT DOCUMENTS

JP    2009-114953    5/2009

OTHER PUBLICATIONS

"Characterization of Mixing in Micromixers by a Test Reaction: Single Mixing Units and Mixer Arrays"; Wolfgang Ehrfeld et al.; Ind. Eng. Chem. Res. 1999, 38, 1075-1082.*
"Preparation of CdSe nanocrystals in a micro-flow-reactor"; Hiroyuki Nakamura et al.; Chem. Commun., 2002, 2844-2845.*
"Microfluidic Electrophoresis Chip Coupled to Microdialysis for in Vivo Monitoring of Amino Acid Neurotransmitters"; Zechariah D. Sandlin et al.; Anal. Chem. 2005, 77, 7702-7708.*
International Search Report and Written Opinion from corresponding international PCT Application No. PCT/US2011/031732 dated Jan. 31, 2012.

* cited by examiner

*Primary Examiner* — Yogendra Gupta
*Assistant Examiner* — John Robitaille
(74) *Attorney, Agent, or Firm* — Klarquist Sparkman, LLP

(57) ABSTRACT

A fluid micro-mixer and micro-reactor array is provided having at least two bonded layers of micro-channels. The micro-mixer can include at least one input port and one output port, and a mixing and/or reaction port. At least one inlet stream separator layer can isolate the inlet ports from one another.

18 Claims, 33 Drawing Sheets
(31 of 33 Drawing Sheet(s) Filed in Color)

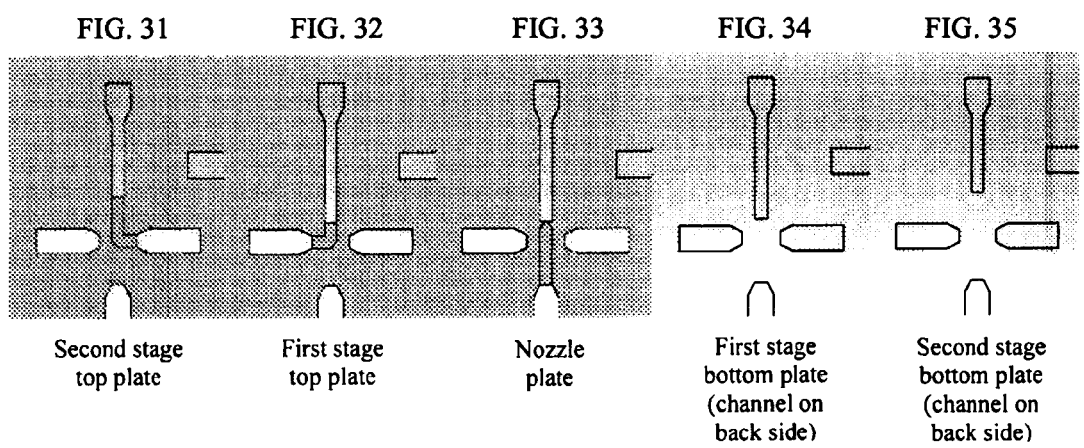

MICRO-CHANNELS, MICRO-MIXERS, AND MICRO-REACTORS

CROSS REFERENCE TO RELATED APPLICATION

This application claims the benefit of the earlier filing date of U.S. Provisional Application No. 60/995,329, filed on Sep. 25, 2007. The entire disclosure of U.S. Provisional Application No. 60/995,329 is considered to be part of the disclosure of the accompanying application and is incorporated by reference.

FIELD

This application relates generally to fluid flow devices. More particularly, the application relates to devices and methods of manufacturing high-throughput fluid micro-mixers and micro-reactors having micro-channels for mixing of reactants with different viscosities, mixing immiscible liquids, gas-liquid mixing, and controlled incremental introduction of limiting reagents.

BACKGROUND

Micro-fluid processing is a rapidly evolving area in research and industry. The need for control over biochemical and chemical reactions is useful for reducing reagent waste and minimizing sample sizes, in addition to reducing exposure risks that may be associated with working with certain hazardous chemicals.

In the past, molding and lithography techniques have been used to construct planar micro-fluid devices out of pliable materials such as flexible polymers and the like. Though these materials are useful for single-layer mixing devices, the process times and workspace requirements for handling large volume of reagents, for example, can become very large, which makes processing such devices both difficult and expensive.

SUMMARY

In one embodiment, devices and methods are provided for mixing reactants with different viscosities, mixing immiscible liquids, gas-liquids mixing, and controlled incremental introduction of limiting reagents. The devices and methods can include micro-mixers and micro-reactors arrays having micro-channels for mixing the reactants.

The foregoing and other features and advantages of the disclosed embodiments will become more apparent from the following detailed description, which proceeds with reference to the accompanying figures.

BRIEF DESCRIPTION OF THE DRAWINGS

The patent or application file contains at least one drawing executed in color. Copies of this patent with color drawings will be provided by the Patent and Trademark Office upon request and payment of the necessary fee.

FIGS. 31-35 show components of a two stage single nozzle device.

DETAILED DESCRIPTION

Interdigital Micro-Mixer

Figure 1:
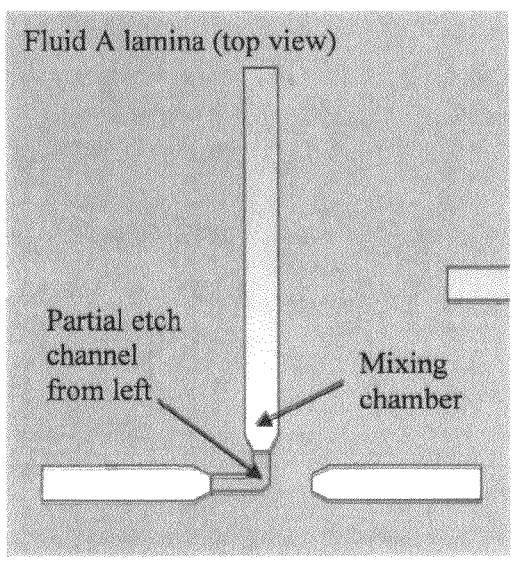
FIG. 1 is a schematic view of a lamina of an interdigital micro-mixer.
Figure 2:
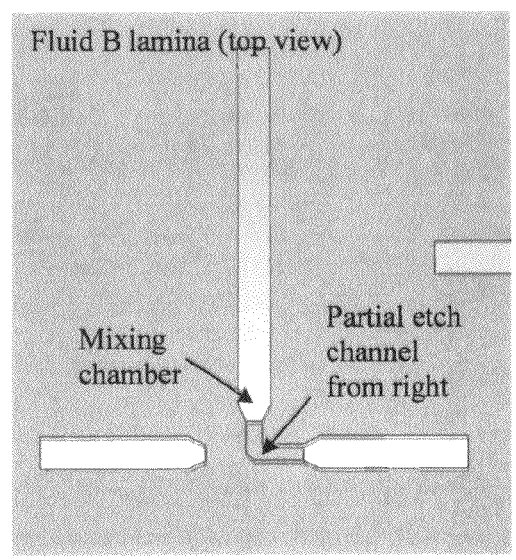
FIG. 2 is a schematic view of a lamina of an interdigital micro-mixer.

This interdigital micro-mixer is created by stacking patterned laminae. Fluid streams are channeled so that very thin fluid layers are interleaved, resulting in very short paths for diffusion of one fluid into the other (and therefore, rapid mixing). FIGS. 1 and 2 show features created using chemical etching with different masks on front and back. Plenums for inlet and outlet reservoirs are creating by etching from both sides while the channels defined the mixer are etched from the front side only.

Figure 3:
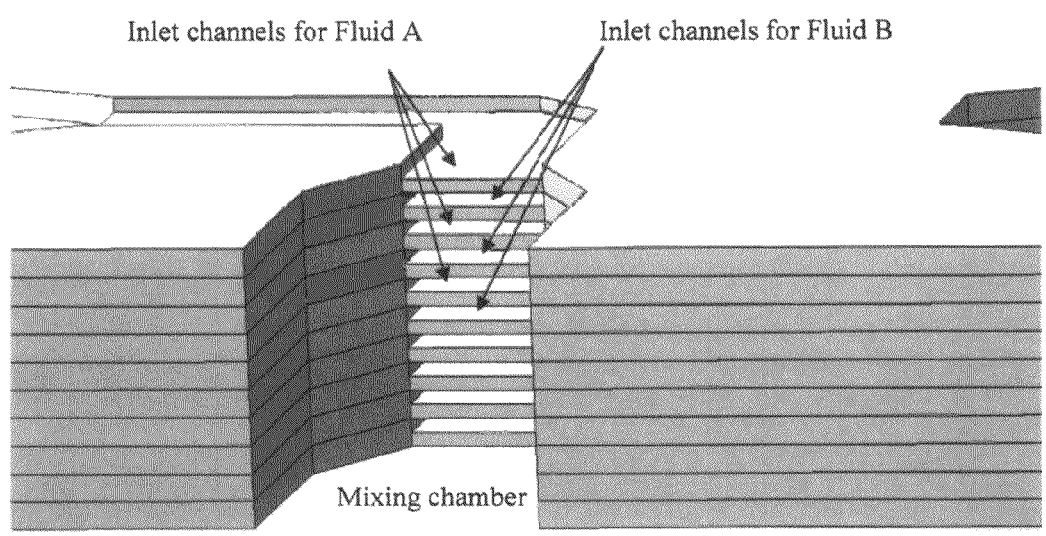
FIG. 3 is a perspective view of a micro-mixer with a plurality of inlet channels.

This design can accommodate mixing of any number of streams as well as sequential or staged mixing. FIG. 3 is a view looking upstream at the channel outlets from the mixing chamber.

Figure 4:
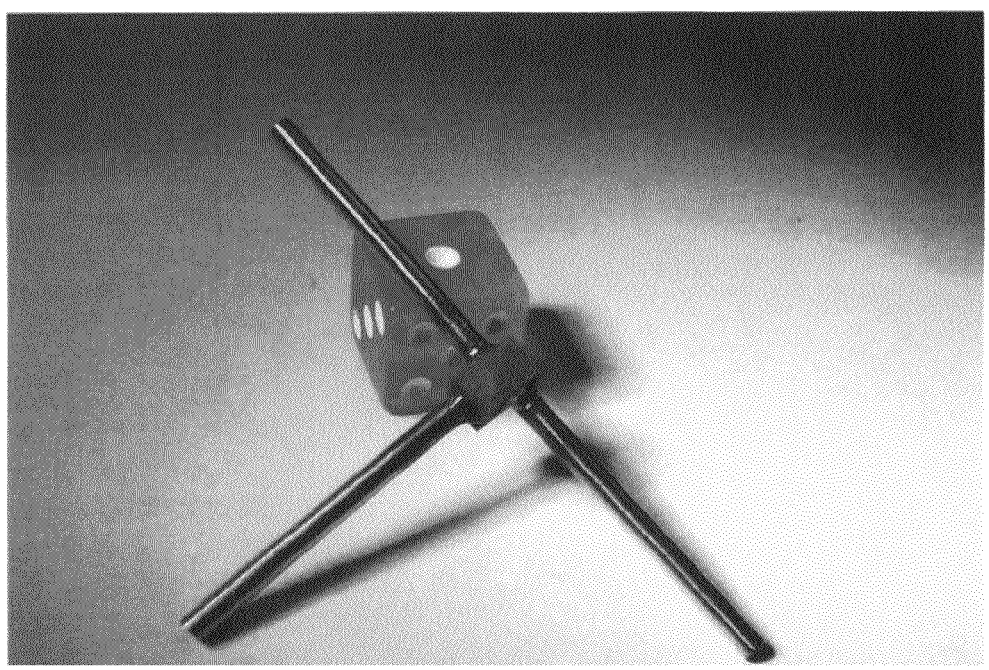
FIG. 4 is an embodiment of a micro-mixer.

FIG. 4 shows another embodiment of the micro-mixer, with a common die next to it for size comparison.

Fabrication techniques used thus far include diffusion bonding (using a vacuum hot press) and wire EDM for separating the individual parts from the array. Layout conventions from the integrated circuit industry have been used to achieve high separation ratios, as well as to create a volume throughput device (see disclosure with OSU docket number 07-32 below). The high separation ratio concept allows lower aspect ratio spans between channel (width vs. thickness of span) to be used and still achieve high volumetric throughput. Lower aspect ratio spans are easier to manufacture, as demonstrated in FIGS. 5-8. Desirably, the aspect ratio is less than 10:1. More desirably, the aspect ratio is less than 8:1, and even more desirably, less than 5:1.

Figure 5:
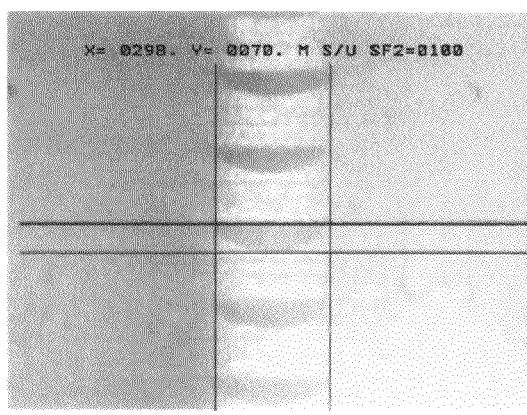
FIG. 5 shows an inlet of a micro-mixer.
Figure 6:
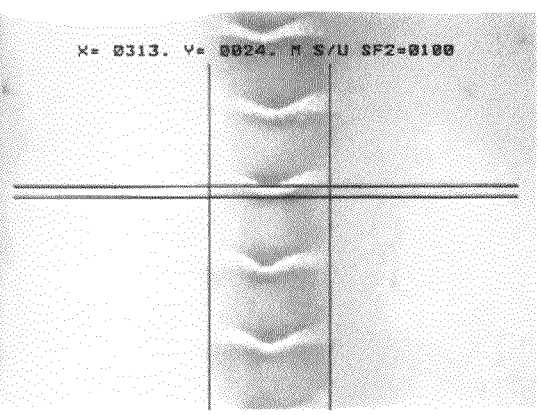
FIG. 6 shows an outlet of a micro-mixer.

The device in the FIGS. 5 and 6 has photochemically etched channels in 100 um thick stainless steel that are approximately 300 um in width and 70 micron in depth, leaving a span 30 um (minimum) in thickness and an aspect ratio of 10:1. FIG. 5 shows the structure in the inlet, where the span is supported by a full thickness (100 um) layer, giving an effective minimum span thickness of 130 um and an aspect ratio of 2.3:1. As can be seen this configuration is structurally sound. FIG. 6 shows the outlet of the mixer, where the fluid layers are interdigitated. Some modest warpage or buckling can be seen in these 10:1 spans, indicating a practical limit of the span aspect ratio at this material thickness when constructing using diffusion bonding.

Figure 7:
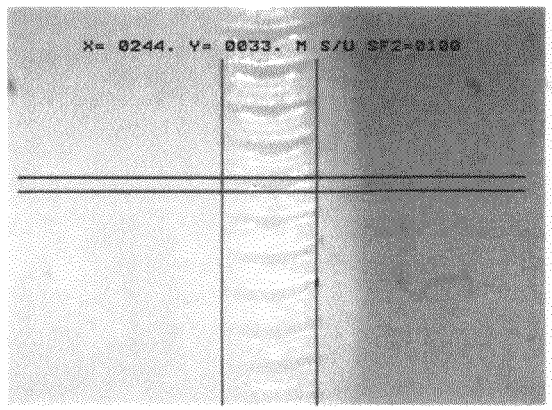
FIG. 7 shows an inlet of a micro-mixer.
Figure 8:
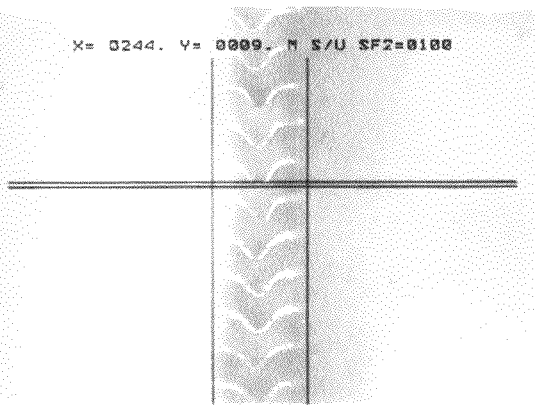
FIG. 8 shows an outlet of a micro-mixer.

The device in FIGS. 7 and 8 has photochemically etched channels in 50 um thick stainless steel that are approximately 250 um in width and 35 micron in depth, leaving a span 15 um (minimum) in thickness and an aspect ratio of 17:1. FIG. 7 shows the structure in the inlet, where the span is supported by a full thickness (50 um) layer, giving an effective minimum span thickness of 85 um and an aspect ratio of 2.9:1. As can be seen, this configuration shows some warpage, due to the decreased material strength, which is function of the cube of the thickness. FIG. 8 shows the outlet of the mixer, where the fluid layers are interdigitated. Severe warpage or bucking can be seen in these 17:1 spans, indicating that the span aspect ratio has a practical limit that decreases with decreasing span thickness when constructed using diffusion bonding.

Because the mixing time is an inverse function of the square of the thickness of the fluid laminae created by the interdigital micro-mixer, it is desirable to make these an this as possible. To do so also requires thin spans between the fluid laminae. Thus, to achieve the highest degree of mixing the approach presented here is to reduce the aspect ratio in individual devices to dimensions that are robust in manufacturing, then array them densely to create a highly parallel system capable of high throughput. Example architectures to create such arrays are discussed in more detail below and in U.S. Provisional Application No. 60/995,329, which is incorporated herein by reference. Further development activities include making devices in polymeric materials, reducing the cost of welding the tubing on the stainless steel devices (through fixturing or alternate welding techniques), reducing bonding costs per part through alternative techniques or increasing the separation ratio of the platform.

Figure 9:
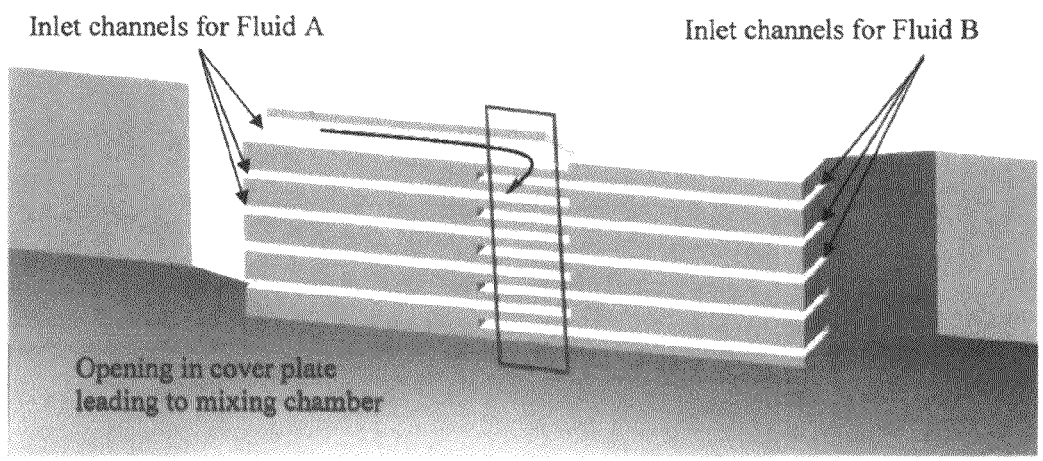
FIG. 9 shows a portion of a micro-mixer.

One example of a polymeric device currently being developed is made by embossing polycarbonate using a diffusion bonded structure as the embossing master. A double transfer embossing process, developed in the MBI, is used to make the final parts. FIG. 9 shows details of the embossed part. A cover plate defines the fourth wall of the inlet chambers and provides the reservoir for the mixing chamber. This embodiment is low cost and easy to manufacture.

Figure 10:
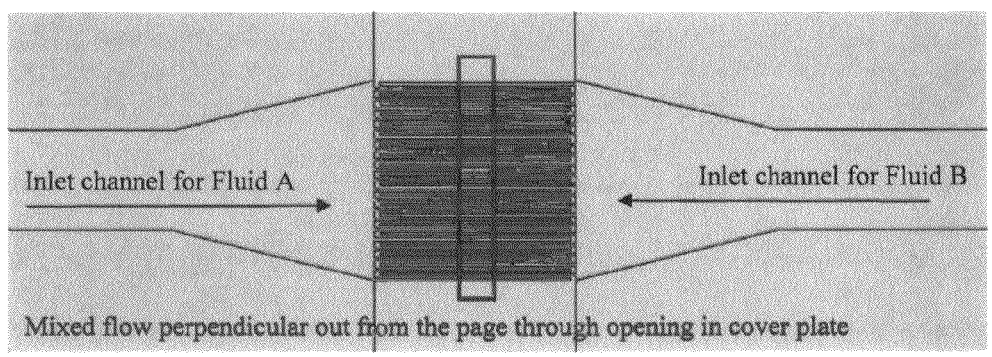
FIG. 10 shows a schematic view of a micro-mixer.

Another embodiment (shown in FIG. 10) is a planar device that can be created using photolithography and soft molding or embossing. This embodiment can be manufactured at very low cost.

A composite structure has also been designed. The interdigital mixing portion is created in metal, taking advantage of the material strength to create the thin laminae. The mixer is then fitted into a polymer housing providing the fluidic connections. One concept for sealing the metal to polymer interfaces is to use infrared radiation. Polymers can be transparent to radiation, while metals will absorb the energy, heating it, and creating localized melting of the polymer at the metal surfaces. By reducing the metal portion to such a small size, very high separation ratios can be achieved (>10 times of a full metal device) and, thus, low cost. The polymer portion can be injection molded as two halves and include integrated fittings or screw threads. Accordingly, a low cost device (<$5 manufacturing cost) can be achieved compared to currently available commercial devices (retail costs from $125 to over $2000).

The construction of devices describe below preferably comprise embossed polymer devices and composite metal and polymer structures.

Interdigital Micro-Mixer Column

Figure 11:
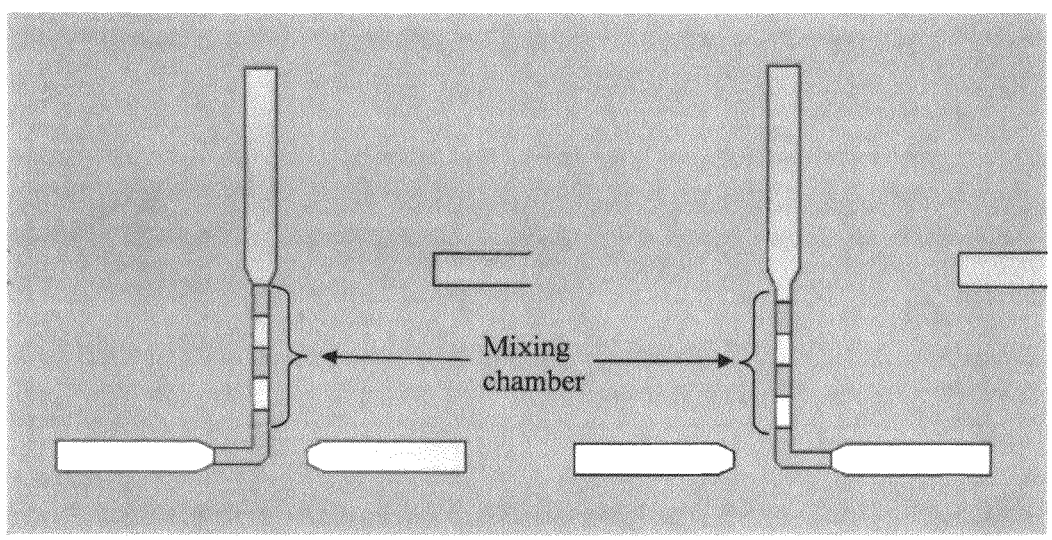
FIG. 11 shows a schematic view of an interdigital micro-mixer.
Figure 12:
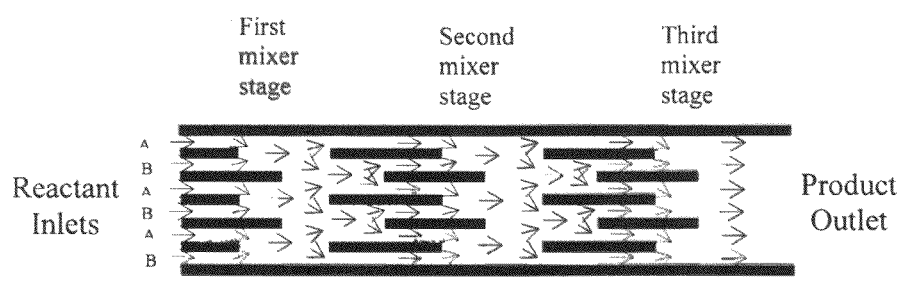
FIG. 12 shows a schematic view of an interdigital micro-mixer.

A key advantage of microchannel technology is the reduction of fluid layer thicknesses to reduce diffusion limitations. This design re-divides the mixed fluids to thin layers again, effectively creating mixing stages in a column. This design also has improved heat transfer with the mixed fluid stream. FIGS. 11 and 12 show how the fluid dividers are staggered, allowing for control of the fluid divisions.

A schematic cross section view of the fluid flow is shown in FIG. 12.

Figure 13:
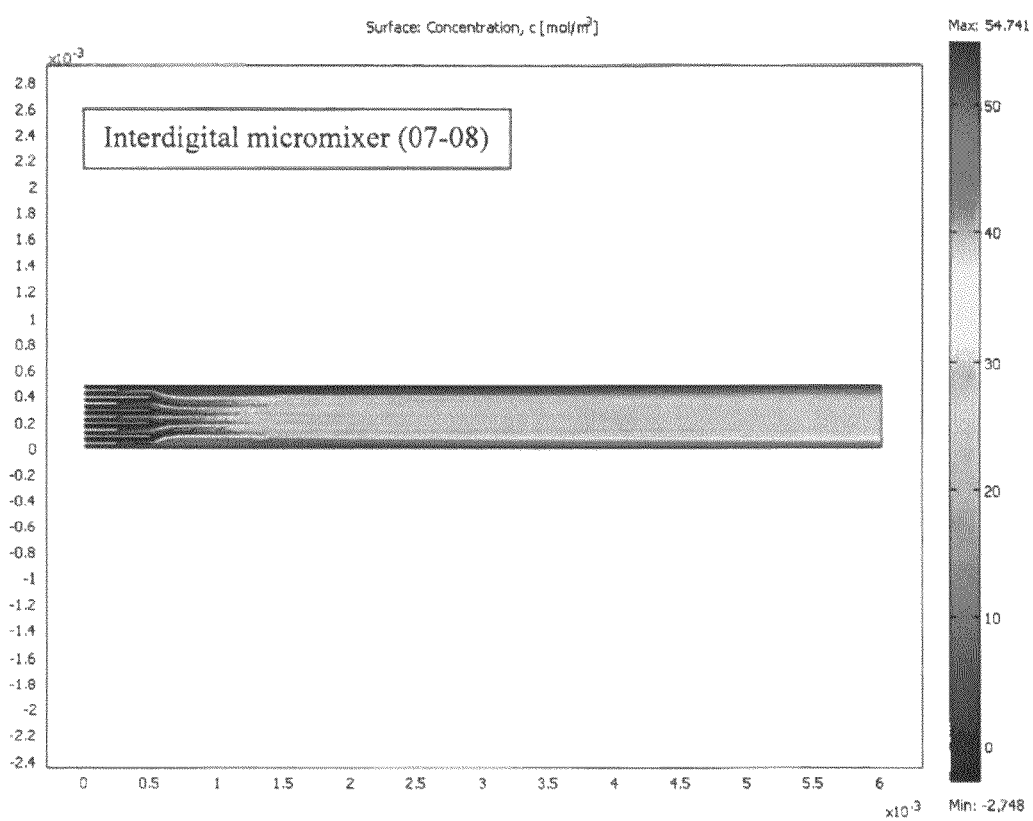
FIG. 13 shows a COMSOL plot showing a concentration profile.
Figure 14:
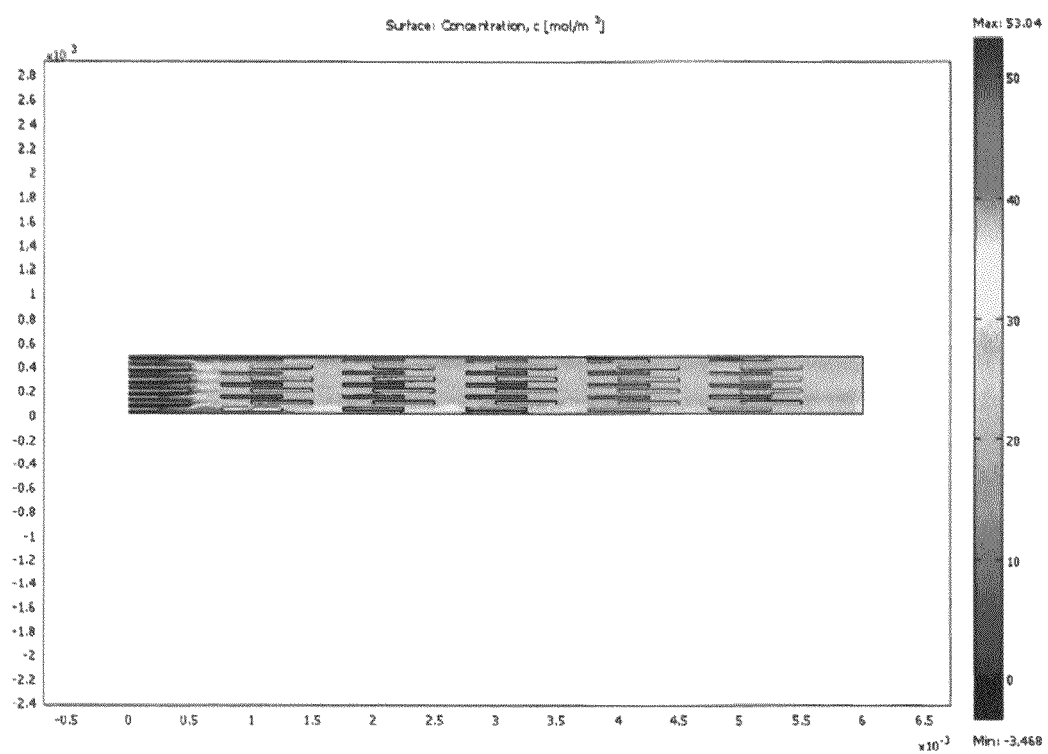
FIG. 14 shows a COMSOL plot showing a concentration profile.

COMSOL plots comparing the concentration profiles for the standard interdigital micro-mixer and the column micro-mixer, thereby demonstrating mixing efficiencies, are shown in FIGS. 13 and 14.

Figure 15:
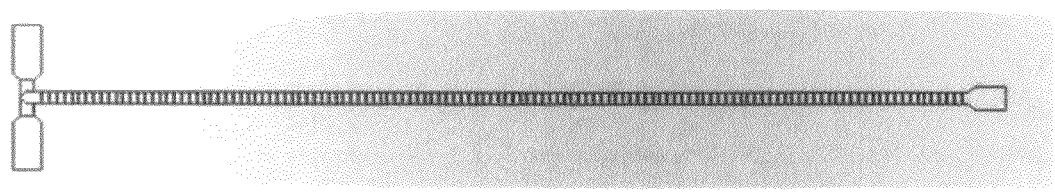
FIG. 15 shows an interdigital micro-mixer column design.
Figure 16:
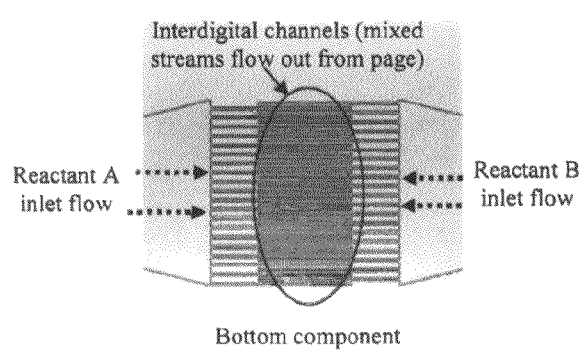
FIG. 16 shows an interdigital micro-mixer.
Figure 17:
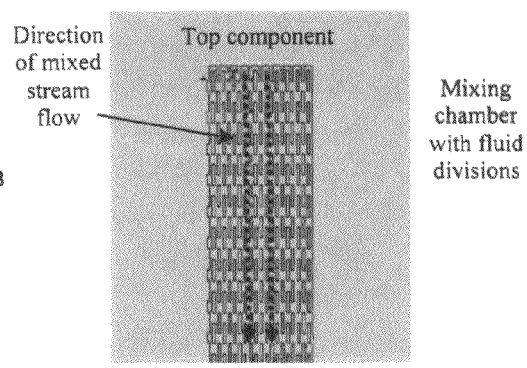
FIG. 17 shows an interdigital micro-mixer.
Figure 18:
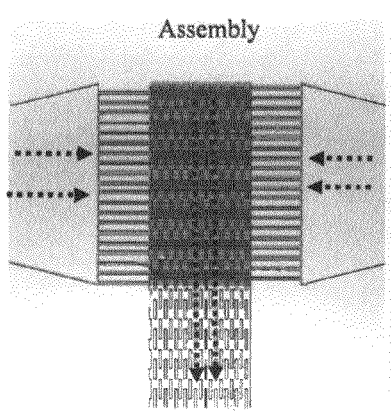
FIG. 18 shows an interdigital micro-mixer.
Figure 19:
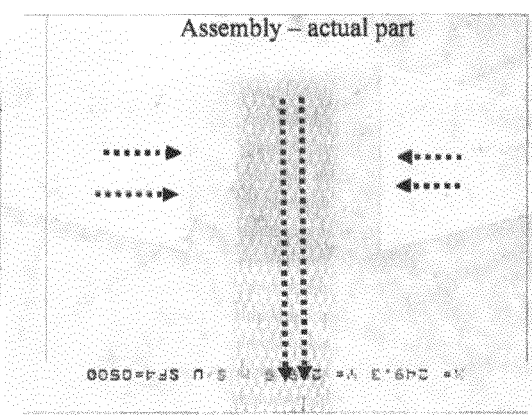
FIG. 19 shows an interdigital micro-mixer.

A long column design is shown in the FIG. 15. The interdigital micro-mixer column design can be fabricated with several short column parts and an array of the long column design of FIG. 15 can be constructed. This design may be particularly well suited for transesterfication of oils (i.e., biodiesel production).

If desired an unequal flow ratio device for diluting a concentrate, multistage designs for multiple operations, polymer and composite constructions, and testing devices can be configured for specific applications.

An example planar design can be fabricated (using both SU-8 molding and a triple transfer embossing technique) as shown in FIGS. 16-19. The interdigital bottom component is a well published embodiment, with the interleaved left and right mixed streams in the figure flowing perpendicular out from the page into a relatively large mixing chamber. The design below divides the streams after mixing to maintain thin film fluid layers, thereby reducing diffusion limitations and enhancing mixing.

Microscale Reactor

Figure 20:
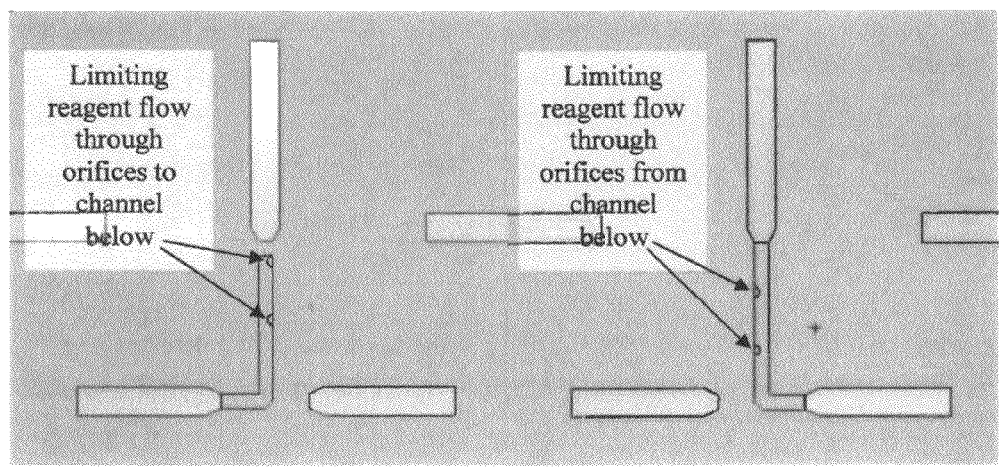
FIG. 20 shows a microscale reactor.

This design is a microscale reactor that enables applications including mixing of reactants with different viscosities, mixing immiscible liquids (for either liquid-liquid reactions or creating emulsions), gas-liquid mixing, and controlled incremental introduction of limiting reagents. The design shown in FIG. 20 includes a layout method that serves to eliminate a separate processing step (and therefore cost) for defining the orifices.

Figure 21:
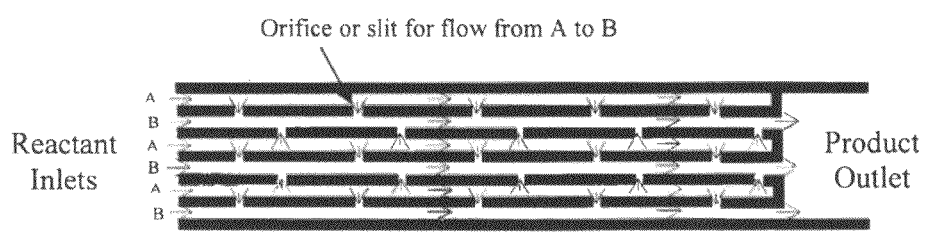
FIG. 21 shows a schematic view of fluid flow through a microscale reactor.

A schematic cross section view of the fluid flow is shown in FIG. 21. By introducing the limiting reagent periodically (though spacing of the orifices), a continuous flow multistage reactor is created. Spacing of the orifices can be calculated from reaction rates and residence times. While this design shows only two component system, multiple streams can be accommodated just as easily. Additionally, the laminated architecture allows coupling of different devices within the same device body, e.g., column mixers feeding microscale reactors.

Figure 22:
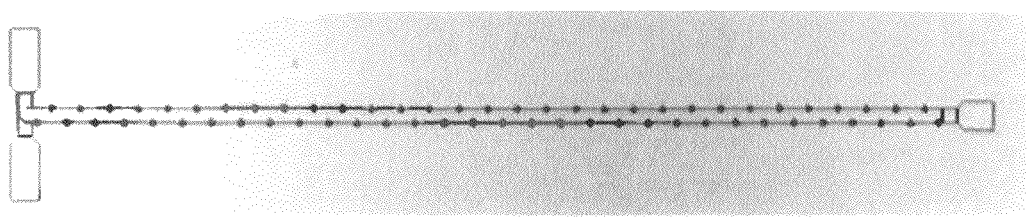
FIG. 22 shows a microscale reactor.

Desirably, the embodiment shown in FIG. 22 can function as a glycerol to methanol reactor.

Development for the microscale reactor can include graduated introduction designs for specific applications and multistage devices. Additionally, designs to reduce manufacturing costs by using polymers and higher device densities can be utilized.

Figure 23:
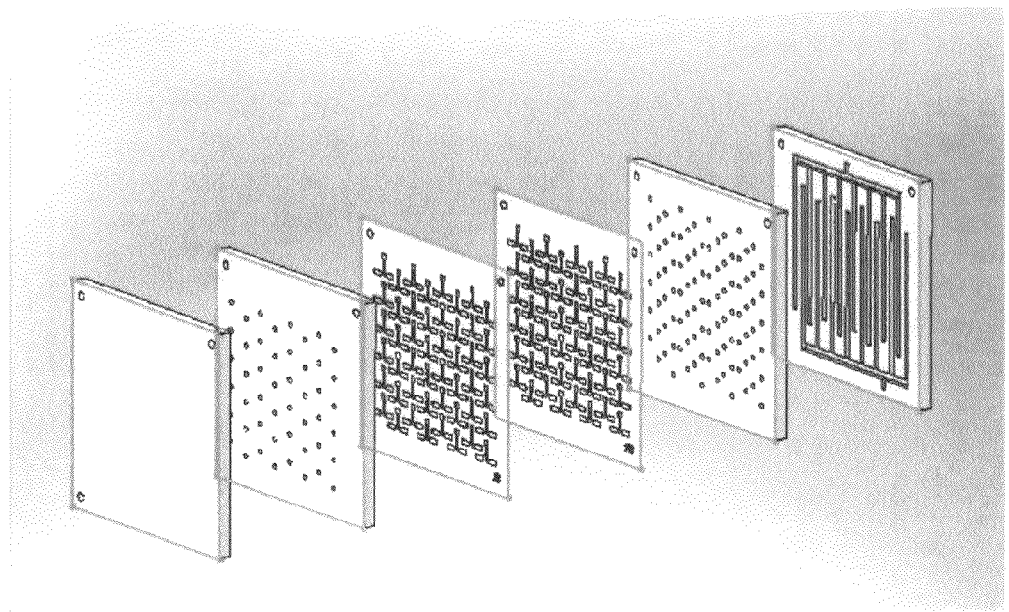
FIG. 23 shows an exploded view of an interdigital micro-mixer.

Architecture for Fluidic Interconnections for Arrays of Interdigital Micro-Mixers This architecture provides fluidic connections to many individual devices placed in a dense array. This allows predictable scaling from an individual device of both performance and manufacturing. This architecture shown in FIG. 23 can be used for many microchannel device designs, including those described above and below, in both metal and polymer materials.

Further development of the arrayed architecture includes increasing the density of devices, simplifying the plate stack, and constructing devices in polymer material.

Integrated Micro-Mixer and Jetting Device

Figure 24:
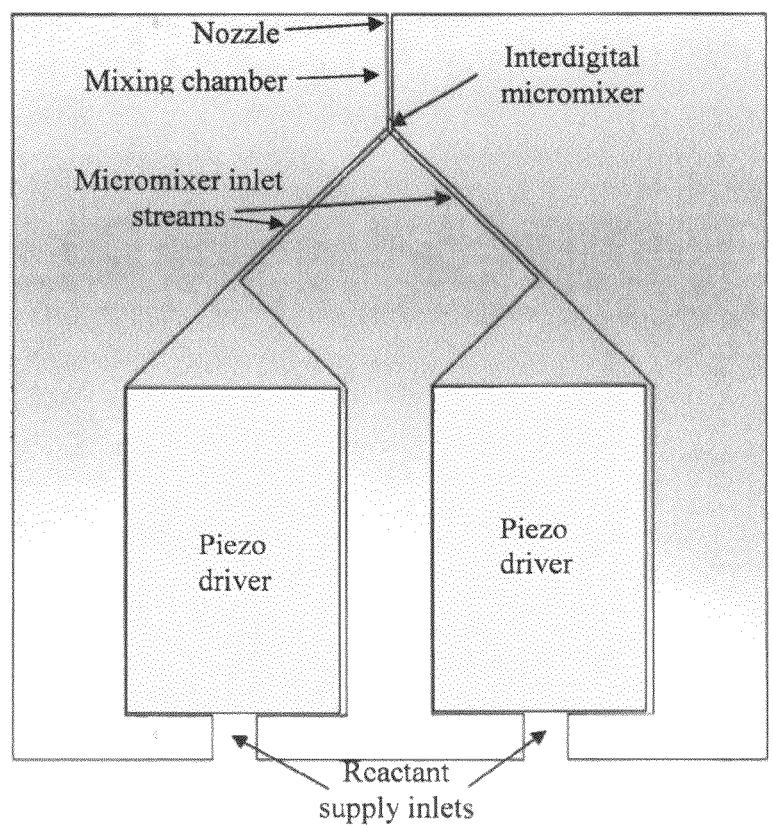
FIG. 24 shows an interdigital mixing device with active fluid drivers.

This device combines the interdigital mixing device with active fluid drivers to create a drop-on-demand chemical deposition device. Mixing or reacting chemical streams just prior to ejection allows deposition of short-lived or unstable reaction products (for example, silver nanoparticles). FIG. 24 shows a schematic view of an embodiment.

Figure 25:
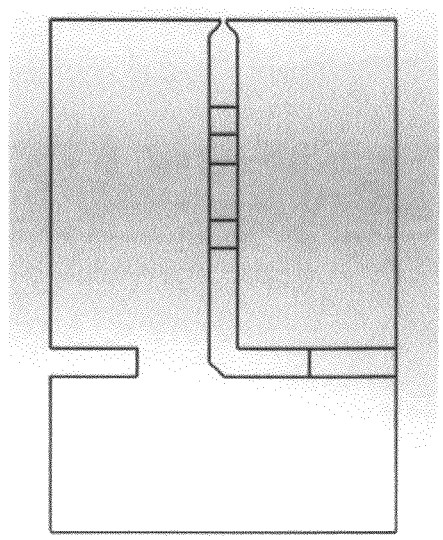
FIG. 25 shows a two component stack of an interdigital mixing device.
Figure 26:
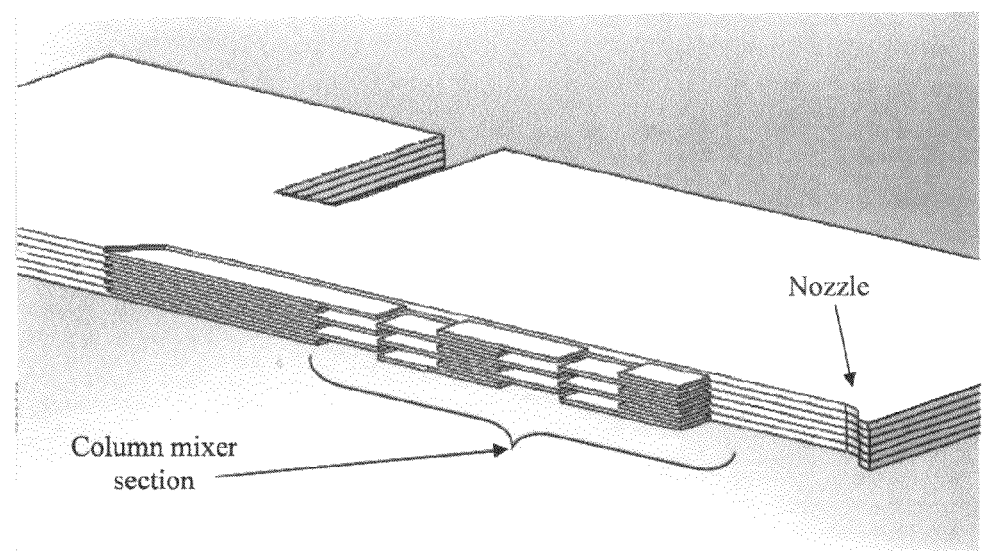
FIG. 26 shows a cross section view of a column mixer with a nozzle portion.

More mature designs include designed bores for droplet size control and a design where the streams merge at the nozzle exit (mixing occurs in the droplet in flight and on the substrate after deposition). Examples of these are discussed below. FIG. 25 shows the construction of a two component stack. Reactants enter from the side inlets, are mixed through a column mixer construction then jetted out a designed nozzle. FIG. 26 shows a cross sectional view showing the details of the column mixer portion and the nozzle.

Figure 27:
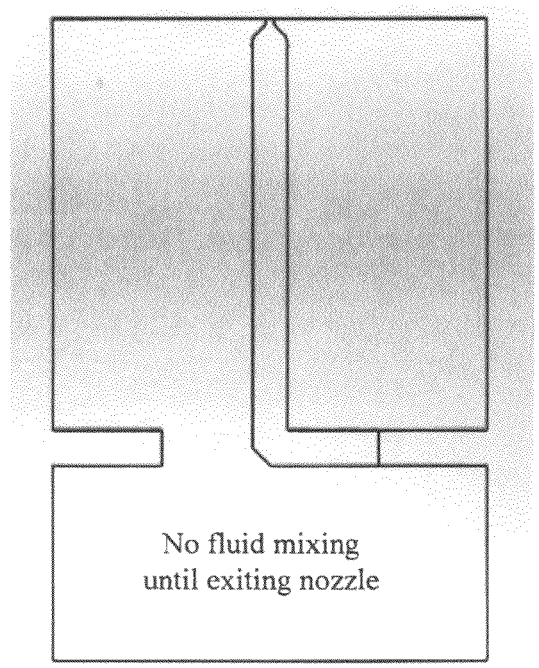
FIG. 27 shows an embodiment of a micro-mixer.
Figure 28:
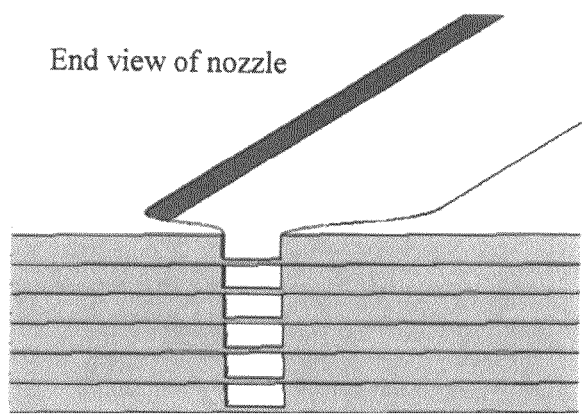
FIG. 28 shows an embodiment of a micro-mixer.

FIGS. 27 and 28 show an embodiment where the fluids do not mix until they leave the nozzle. Miscible fluids will coalesce into a single droplet in flight. This phenomenon is well characterized by the inkjet printing industry. By using methods such as differential chemical etching, the dividers between the channels can be very thin, thereby enhancing the coalescence of the droplets.

Future developments can include prototyping of externally driven devices. For example, integrated pulse drivers can be utilized. Externally driven devices can include nozzle bore, reaction chamber characterization, "mix in flight" designs, and composite polymer and metal constructions.

Nanoparticle Generator

This device is an integration of an interdigital micro-mixer with an internal nozzle array. Reactant or emulsion fluid droplets are pulsed from the nozzles into excess reactant or continuous phase stream using a driver such as a piezo micropump. The driver may be integrated into the device or external to the device. This device can be used to generate nanoparticles, emulsions, or controlled reactions of immiscible reactants by jetting small (picoliter) reactant droplets into a fluid or reactant in excess. By creating a stream of consistently sized droplets, continuous, precision methods for making nanoparticles and microemulsions can be realized. The device can include subsequent micromixing stages to quench reactions, or complete additional reaction steps. The device architecture lends itself to multiple reaction stages within one small device. For example, precursor reactants may be mixed prior to jetting into subsequent fluid streams.

Figure 29:
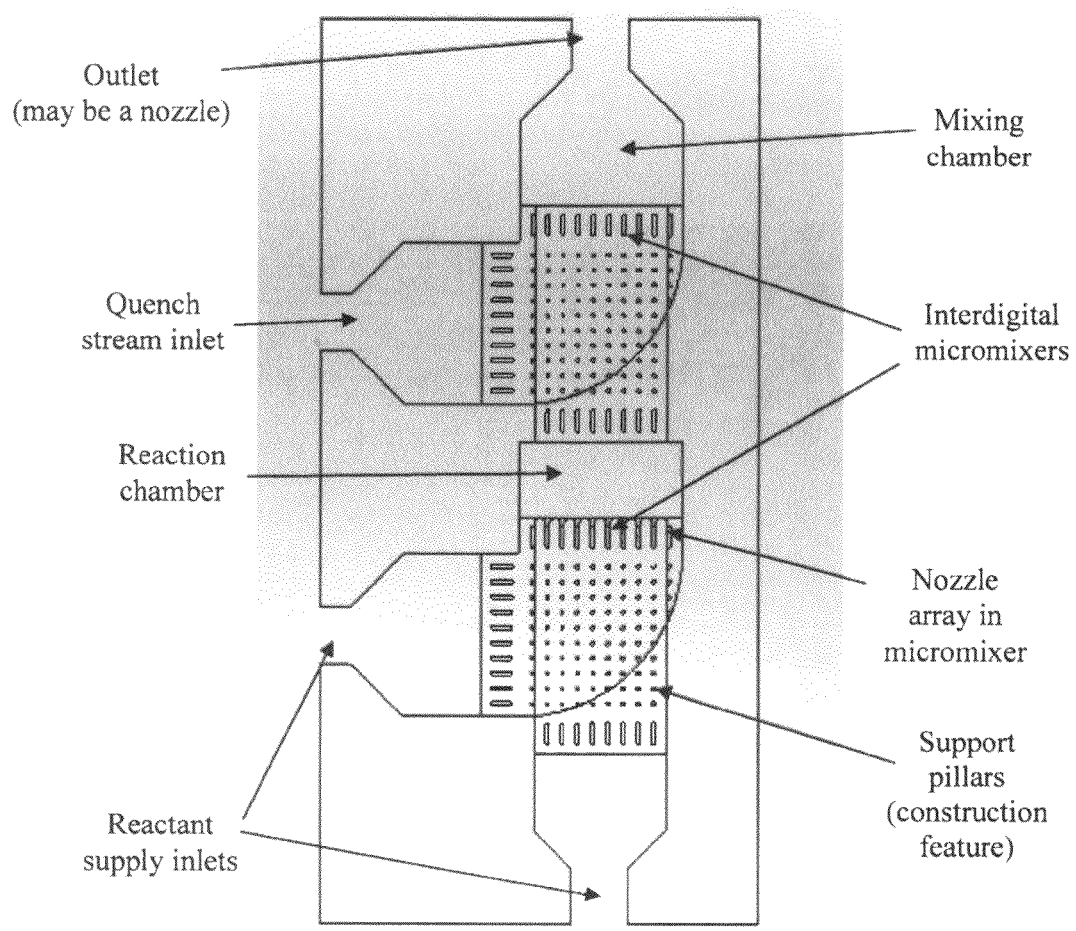
FIG. 29 shows a multi-nozzle micro-mixer.
Figure 30:
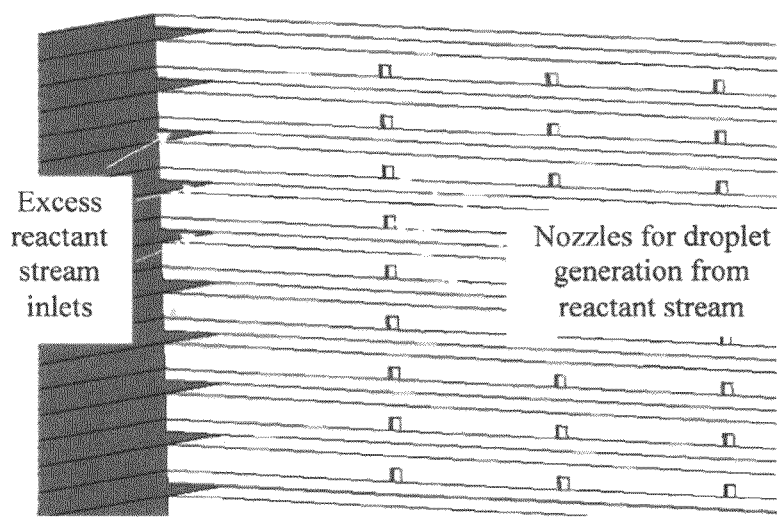
FIG. 30 shows a partial perspective view of a multi-nozzle device.

FIG. 29 shows the construction of a multi-nozzle design. FIG. 30 shows a perspective view looking back towards the exit from the nozzle array.

FIGS. 31-35 show the components of a two stage single nozzle device. The layers are stacked to form the construction. With respect to figure orientations below, the nozzle fluid enters from the bottom plenum, the first stage fluid enters from the right plenum, the second stage fluid enters from the left plenum, and the mixture exits from the top plenum.

Figure 36:
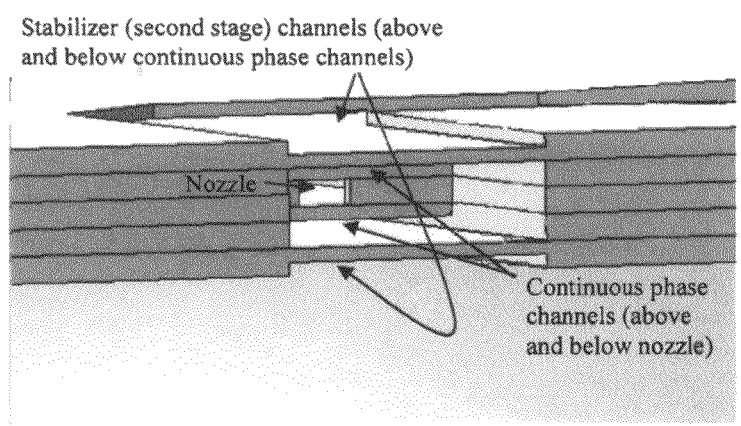
FIG. 36 shows a schematic perspective view of a micro-mixer.

FIG. 36 shows a perspective view looking back towards the exit from the nozzle assembly.

Figure 37:
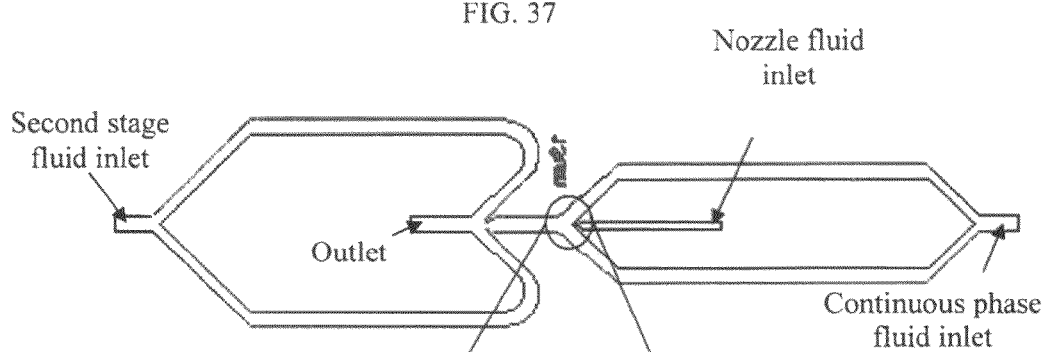
FIG. 37 shows a single layer micro-mixer.
Figure 38:
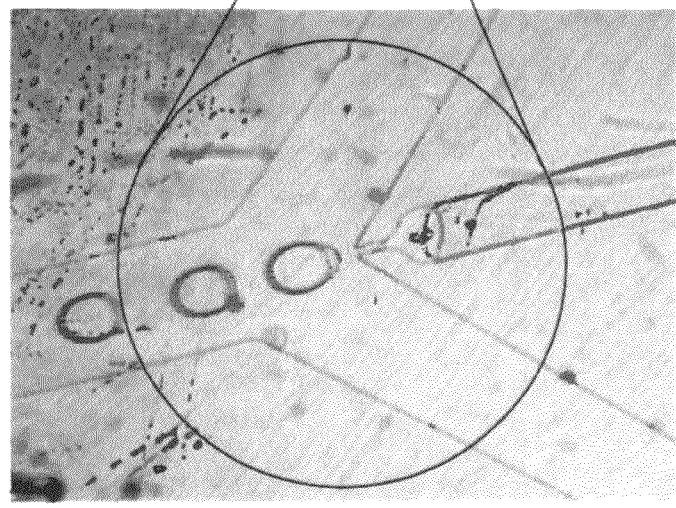
FIG. 38 shows a close-up view of a portion of the micro-mixer shown in FIG. 37.

A single layer device has been created using soft lithography, the details of which are shown in FIGS. 37 and 38, as well as a still picture of the device in operation. The device is creating a microemulsion of water in oil.

Figure 39:
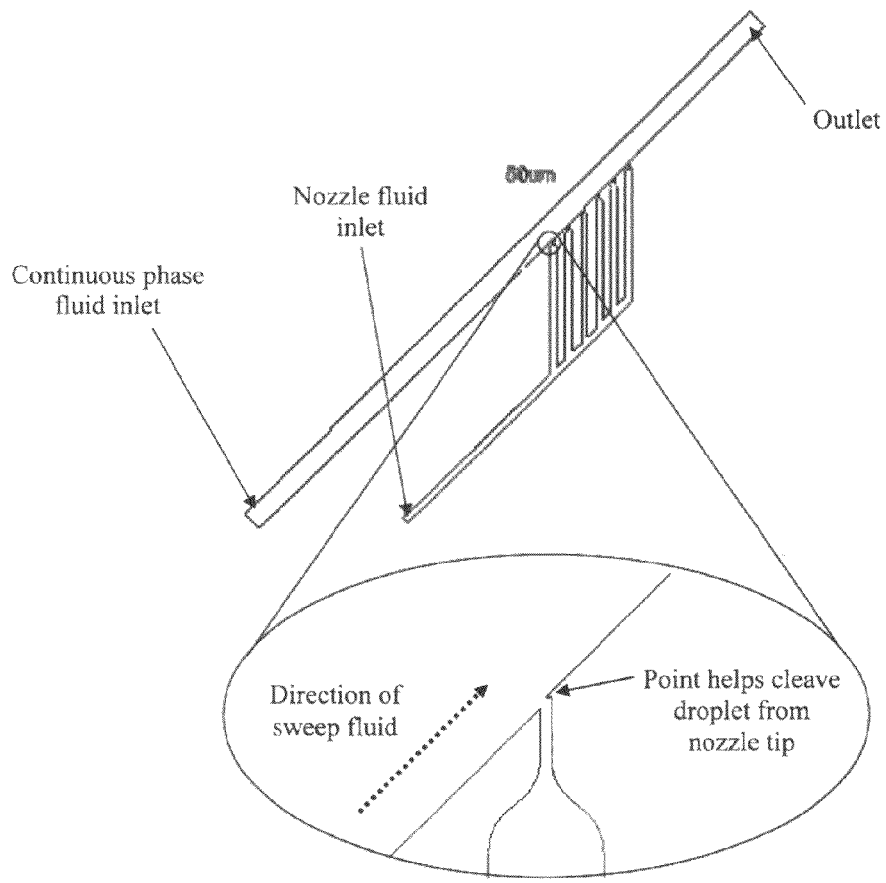
FIG. 39 shows a micro-mixer with a nozzle in a planar device.

An alternate design that is amenable to creating a dense array of nozzles in a planar device is shown in FIG. 39.

Figure 40:
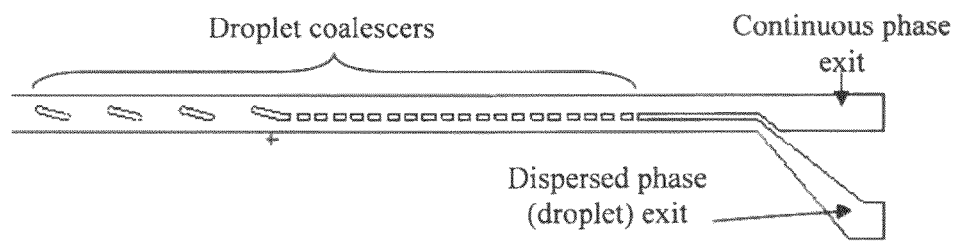
FIG. 40 is a schematic view of a micro-mixer.

FIG. 40 shows coalescing and separation stages that have been added and are can be used in PDMS structures.

Figure 41:
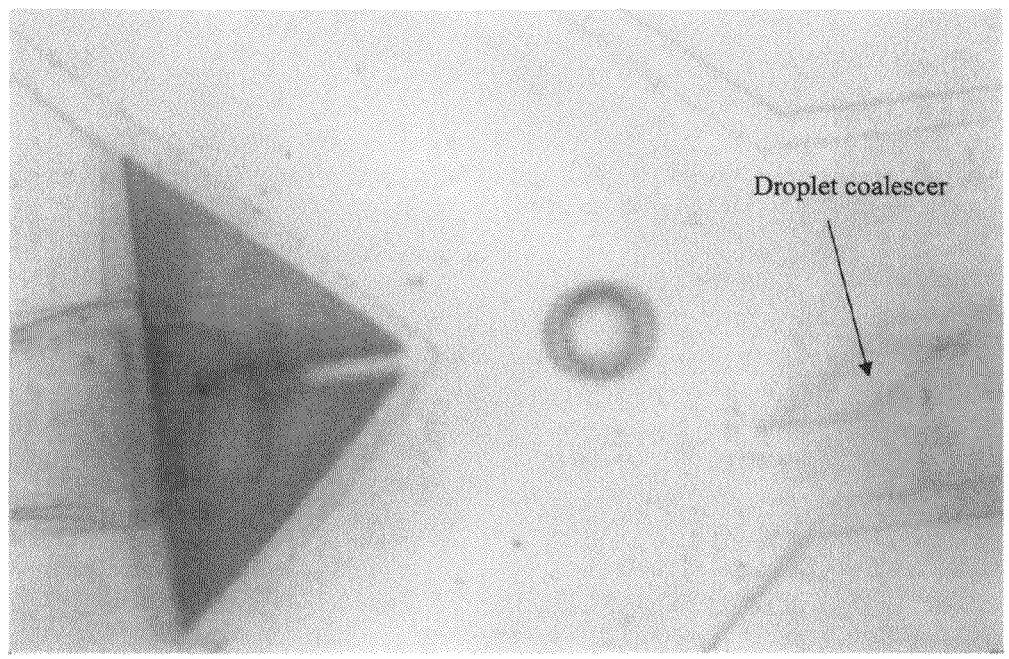
FIG. 41 shows a view of a portion of a micro-mixer.

A dual layer device using a thin kapton piece sandwiched between PDMS layers. A laser cut in the kapton creates the nozzle (see FIG. 41).

Figure 42:
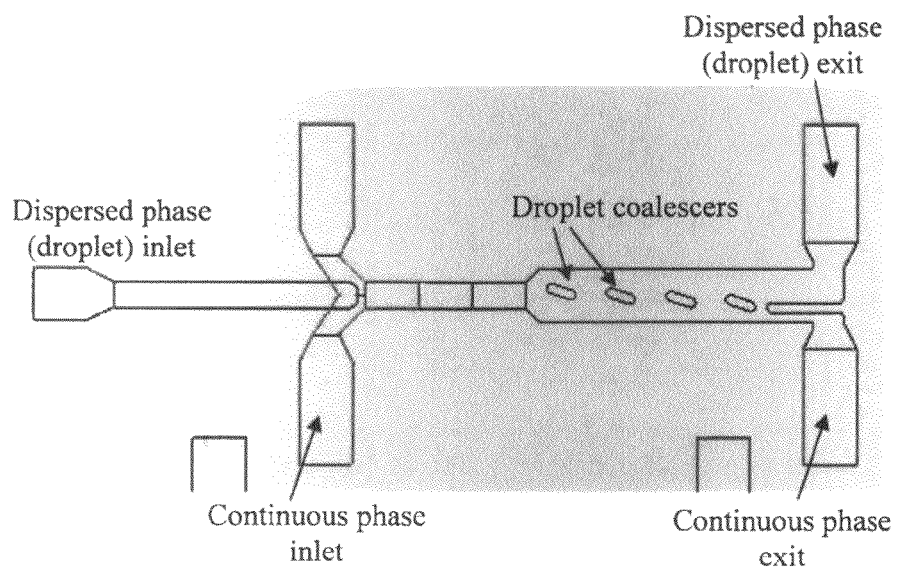
FIG. 42 is a schematic view of a micro-mixer.
Figure 43:
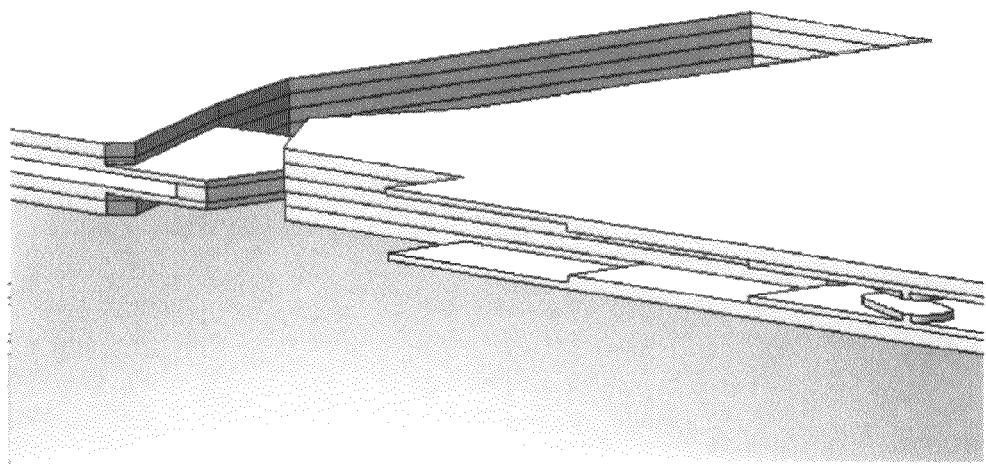
FIG. 43 is a partial perspective view of a micro-mixer.

This design has also been applied to metal laminae construction as shown in FIGS. 42 and 43.

Development of this device can be performed in multiple stages. First, fluid flow can be characterized using non-reactive systems. Second, specific reaction chemistries can be developed with the design being refined as needed for each specific application. In addition, a full system for precision deposition of nanomaterials can be constructed.

Appendix

The disclosures of each of the following references identified in this Appendix are hereby incorporated by reference, in their entirety and for all purposes, into this application.

1. U.S. Pat. No. 6,793,831, titled Microlamination Method for Making Devices, issued Sep. 21, 2004.
2. U.S. Pat. No. 6,672,502, titled Method for Making Devices Having Intermetallic Structures and Intermetallic Devices made thereby, issued Jan. 9, 2004.
3. U.S. patent application Ser. No. 10/803,502, titled Method for making devices having intermetallic structures and intermetallic devices made thereby, filed Mar. 17, 2004.
4. U.S. Patent Publication No. 2007-0029365 A1, titled High volume microlamination production of devices, published Feb. 8, 2007.
5. U.S. Patent Publication No. 2005-0220681 A1, titled Microchemical Nanofactories, published Oct. 6, 2005.
6. WIPO Publication No. 2005/045894, titled High Volume Microlamination Production of Devices, published May 19, 2005.
7. U.S. patent application Ser. No. 11/243,937, titled Microfluidic devices, particularly filtration devices comprising polymeric membranes, and method for their manufacture and use, filed Oct. 4, 2005.
8. U.S. Patent Publication No. 2007/0125489 A1, titled Microfluidic welded devices or components thereof and method for their manufacture, published Jun. 7, 2007.
9. WIPO Publication No. 2007/142983, titled Microreactor process for making biodiesel, published Dec. 13, 2007.
10. U.S. Patent Publication No. 2008/0108122 A1, titled Microchemical Nanofactories, published May 8, 2008.

11. U.S. Patent Publication No. 2007/0020400 A1, titled Method and Apparatus for Chemical Deposition, published Jan. 25, 2007.
12. U.S. Patent Publication No. 2007/0128707 A1, titled Method for Making Metal Oxides, published Jun. 7, 2007.
13. U.S. Patent Publication No. 2007/0184576 A1, title Solution Deposition Of Inorganic Materials And Electronic Devices Made Comprising The Inorganic Materials, published Aug. 9, 2007.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A fluid micro-mixer apparatus comprising: a plurality of first microchannels, comprising at least one input port and at least one output port, the first microchannels being configured to receive a first fluid; and a plurality of second microchannels, comprising at least one input port and at least one output port, the second microchannels being configured to receive a second fluid, wherein a plurality of patterned laminae are stacked so that adjacent patterned laminae define the first or second microchannels therebetween, the first and second microchannels having a width in a direction that is generally parallel to a plane of an adjacent lamina and a height in a direction that is generally perpendicular to the plane of the adjacent lamina, and the width of the first microchannels is greater than the height of the first microchannels and the width of the second microchannels is greater than the height of the second microchannels, and comprising at least one separating structure within one or more of the first and second microchannels configured to mechanically separate dispersed phase components from a continuous phase of the first or second fluids.

2. The apparatus of claim 1, wherein the plurality of first and second microchannels are interdigitated.

3. The apparatus of claim 1, further comprising at least one reaction chamber disposed to receive the first and second fluids.

4. The apparatus of claim 1, further comprising at least one mixing chamber, the mixing chamber being disposed between at least one of the input ports and at least one of the output ports, wherein the mixing chamber is configured to receive both first and second fluids.

5. The apparatus of claim 1, further comprising a binding material disposed between adjacent patterned laminae.

6. The apparatus of claim 1, wherein the first and second fluids have unequal flow rates.

7. The apparatus of claim 1, further comprising one or more additional microchannels configured to receive an additional one or more fluids, the additional one or more fluids being different from the first and second fluids.

8. The apparatus of claim 1, comprising a plurality of reaction chambers arranged in parallel in a dense array.

9. The apparatus of claim 1, wherein the outlet ports of the second microchannels have a smaller exit area than the outlet ports of the first microchannels.

10. The apparatus of claim 1, further comprising one or more drivers configured to provide pulsed flow to the second fluid.

11. The apparatus of claim 10, wherein the one or more drivers comprise piezo micropumps.

12. The apparatus of claim 4, where the mixing chamber contains flow paths defined by at least some of the plurality of the patterned laminae.

13. The apparatus of claim 1, further comprising a plurality of orifices between at least some adjacent microchannels.

14. The apparatus of claim 13, wherein the plurality of orifices are spaced to provide controlled introduction of a second fluid to a first fluid.

15. A fluid micro-mixer apparatus comprising: a plurality of patterned laminae that are stacked so that adjacent patterned laminae define microchannels therebetween, wherein at least some of the microchannels comprise first outlet ports, the first outlet ports having a width in a direction that is generally parallel to a plane of an adjacent lamina and a height in a direction that is generally perpendicular to the plane of the adjacent lamina, and the width of the plurality of first outlet ports is greater than the height of the outlet ports wherein at least some of the microchannels comprise second outlet ports, the second outlet ports comprising nozzles that have a smaller area than the first outlet ports.

16. The apparatus of claim 15, wherein adjacent microchannels formed by the patterned laminae do not intersect with one another, such that delivery of a first fluid and a second fluid through adjacent microchannels does not result in mixing of the first and second fluids until exiting the microchannels.

17. The apparatus of claim 15, further comprising one or more drivers configured to provide pulsed flow of fluid out of the nozzles.

18. The apparatus of claim 17, wherein the one or more drivers comprise piezo micropumps.

* * * * *